March 16, 1954 H. C. BURNS ET AL 2,672,497
METHOD OF PRODUCING STORAGE BATTERIES
Original Filed Feb. 7, 1947
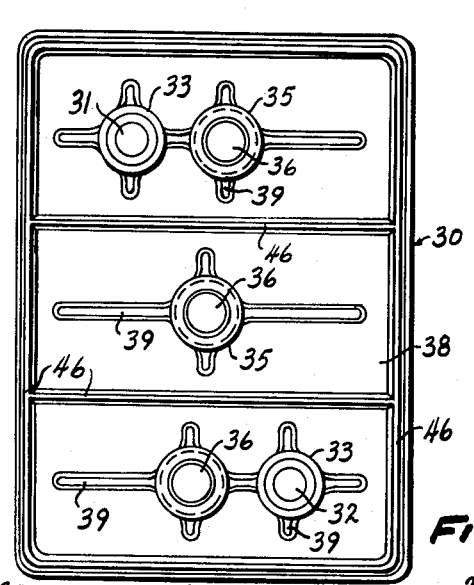
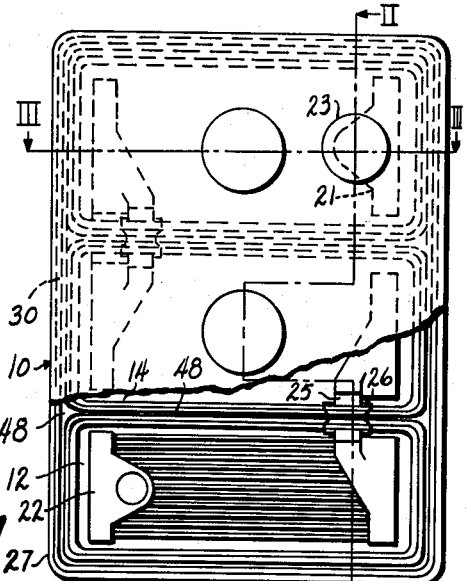
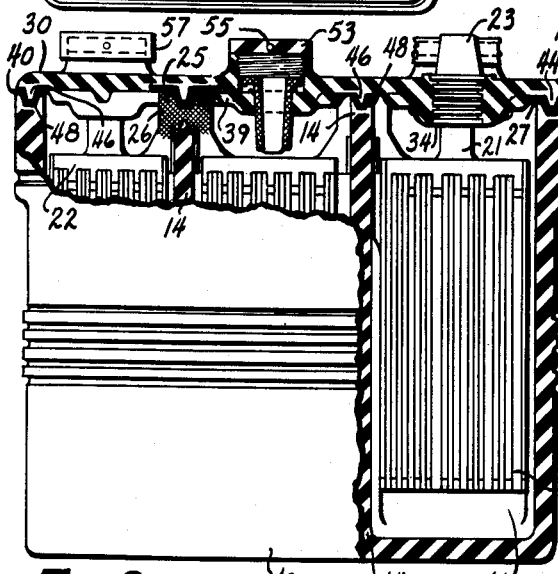
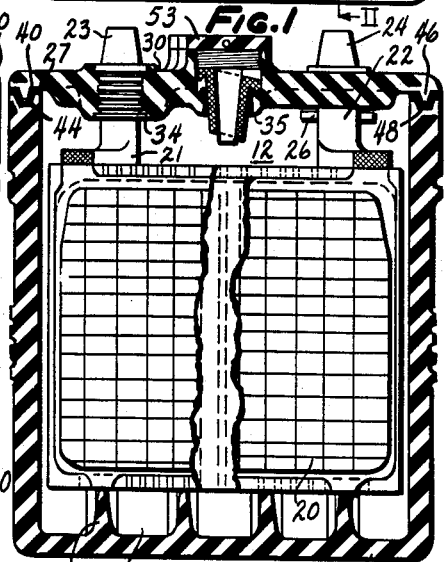
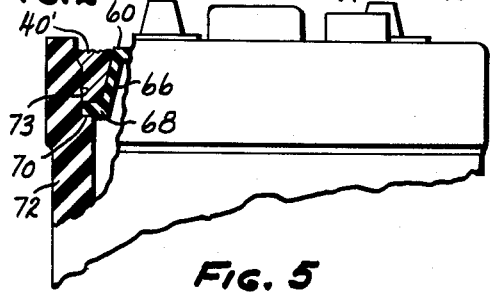
INVENTORS.
Howard C. Burns
Harland D. Wilson
BY
Falvey, Souther & Stoltenberg
ATTORNEYS Patented Mar. 16, 1954

2,672,497

UNITED STATES PATENT OFFICE 2,672,497

METHOD OF PRODUCING STORAGE BATTERIES

Howard C. Burns and Harland D. Wilson, Toledo, Ohio, assignors to The Electric Auto-Lite Company, Toledo, Ohio, a corporation of Ohio Original application February 7, 1947, Serial No. 727,080. Divided and this application August 15, 1951, Serial No. 241,966

6 Claims. (Cl. 136—167)

This invention relates to storage batteries and, in its most specific aspects, to means and method of providing a seal between the container and cover therefor, and is a division of our application Serial No. 727,080, filed February 7, 1947.

The invention comprises the provision of a storage battery suitable for use under extremes of temperature and vibration, the battery being capable of withstanding, without impairment, extremely high or sub-zero temperatures and abrupt changes from high to low temperatures, or vice versa, and not being affected by violent shocks and severe vibrations, conditions which are found when the battery is used in aircraft, farm tractors, trucks and also military vehicles such as tanks and the like.

The invention embraces the utilization of the heat generated in the chemical and electrochemical processing of a storage battery to produce a substantially permanent, hermetic seal, and acid-proof joint between storage battery covers and container.

The invention includes the provision of multiple or single cell storage batteries which may be hermetically sealed and indefinitely stored, either in the dry charged, or in the moist charged condition.

The invention comprehends the provision of a cementitious compound which is processed to effect an electrolyte-tight, vibration and temperature-proof substantially permanent seal between battery covers and container, either as a result of the formation of the battery or by a method which in no way interferes with the processing of the battery or impairs any of its component parts.

Heretofore wherever conventional batteries are subjected to severe service conditions, such as high temperature, severe vibrations, extreme sub-zero temperatures, or sudden changes from such low to high temperatures, the first component of the battery to fail is the sealing compound. Failure of the sealing compound to maintain an acid-tight joint between the covers and the container causes loss of electrolyte and finally failure of the battery.

The conventional sealing compounds for storage batteries now in use are essentially thermoplastic in nature, generally in the form of a steam-blown asphalt or having a bituminous or petroleum base and hence their sealing action and hardness are governed by the temperatures to which they are subjected. Battery seal failures occur at high temperature because such sealing compounds will soften to the extent of running down into the cells and also blister due to gas pressure within the cells. Under severe vibration, seal failure is usually caused by the loss of adhesion of the compound to the sealed surfaces or by cohesion or contraction cracks. Battery seal failure is more readily manifested under vibration, coupled with high temperature, due to severe blistering, cohesion failures and loss of adhesion of the compound to the container and covers. Under extreme sub-zero temperatures, the battery seal fails because the sealing compounds become very hard and brittle forming cohesion or contraction cracks; in addition, seal failure is caused under sudden changes in temperature, such as from sub-zero to relatively high atmospheric temperature, due to the formation of cohesion or contraction cracks.

The aforesaid performance failures of present day storage batteries are attributed mainly to the fact that the conventional sealing compounds are thermoplastic and do not form a temperature-proof or acid-tight rigid joint between the battery covers and its container.

It is one of the main purposes of this invention to overcome and cure the aforesaid storage battery performance failures through the provision of a low-cost, very effective, acid-resistant, temperature and vibration-proof seal or acid-tight rigid joint between the battery cover and its container. The seal or bond of the invention is obtained by the use of a thermosetting resin or cementitious compound which is set or cured by the application of moderate heat for relatively short time and hastened by the addition of suitable accelerators. The compound is processed to effect the seal without the employment of complicated equipment, skilled operators, or time-consuming operations.

One of the principal objects of the invention resides in the production of a battery having a cover adhering to a container through a permanent, thermosetting cement, more particularly in providing a unitary cover for a multicellular container wherein every cell is completely isolated by joining the cover to the container through a cemented thermoset connection extending about the perimeter of each cell, producing thereby a permanent, acid-tight, temperature and shock-proof seal therebetween.

Another object of this invention is to produce a seal between a storage battery cover and its container by a liquid phenolic casting resin or composition of the thermosetting class, set or cured at relatively low temperature and pressure to provide a substantially permanent bond or electrolyte-leakage-proof joint between container and cover.

Another object of this invention is to produce a storage battery having a cover attached to the container by a bond or seal obtained without the use of expensive or complicated equipment and being at least as strong as the material from which these parts are formed, which seal, electrolyte-proof, will neither shrink, swell, nor crack under the combined action of extremes of temperature and vibration to which the battery may be subjected in use.

An additional object of the invention is the provision of a one-piece cover for a multiple cell battery having either under-the-cover or external intercell connectors, and the production of a permanent bond or seal between the container and cover by a thermosetting resin cement preferably in an interlocking connection such as a tongue-and-groove arrangement of the container walls and cell partitions with the under side of the cover or a double flange cover construction as well as a roughened substantially flat surface joint between the cover and container.

A further object of the invention is the provision of a novel and very inexpensive method of sealing the battery cover to its container by applying a phenolic casting resin mixed with suitable accelerating agents as bonding means and solidifying or setting such bonding means by the heat inherently generated in the chemical and electrochemical processing of the battery.

An additional object of this invention is to provide a fully and completely sealed battery with readily removable seals for the filling vent plugs, which vent plug seals may readily be removed at the time the battery is placed in service.

A further object attained by this invention is the use of a sealing means which is capable of bonding not only component parts of a storage battery made of the same or similar material, such as hard rubber or other molded, non-conductive, acid-resisting material, but also of producing a permanent seal or bond between nonconductive, acid-resisting materials and a metallic current-conducting material, such as antimonial lead used as cell interconnecting means, without the application of excessive pressure or high temperature.

Other objects and advantages of this invention relating to the arrangement, materials and methods, operation and function of the related elements of the structure, to various details of construction, to combinations of parts and to economies of manufacture, will be apparent to those skilled in the art upon consideration of the following description and appended claims, reference being had to the accompanying drawings, forming a part of this specification wherein like reference characters designate corresponding parts in the several views.

Fig. 1 is a plan view of a storage battery, parts being broken away, to show features of the invention herein;

Fig. 2 is a view on the line II—II Fig. 1;

Fig. 3 is a view on the line III—III Fig. 1;

Fig. 4 is a bottom plan view of a cover for use with a single container, three-cell battery; and Fig. 5 is a fragmentary section through the upper edge of a storage battery of the more conventional design embodying a seal of the invention herein.

In the drawings, for purposes of a typical illustration, the features of the invention are shown as incorporated in a storage battery of the single container, three-cell type construction, generally used in self-propelled vehicles but it is to be understood that the utilization of the invention is contemplated wherever the same may be found to be applicable.

In the embodiment illustrated, the storage battery comprises, as particularly shown in Figures 1 and 2, a multi-cellular container 10 of suitable non-current conducting, electrolyte or acid-resisting material. The container 10 is formed or molded from any composition having such characteristics, preferably hard rubber or synthetic resin plastics, and is divided into battery cell compartments 12 by partitions 14. The partitions 14 are shown as integral parts of the container and may be one or more in number, thus providing the desired number of battery cell compartments for producing a battery of predetermined voltage. The bottom of each cell compartment 12, as illustrated in Figure 3, is provided with spaced, upstanding narrow ribs 16 forming element rests or bridges which define sediment spaces 18 on the bottom of the container 10. The narrow ribs or bridges 16 act as supporting means for each cell element 20, the latter being provided with post straps 21 and 22 for the respective negative and positive plate groups arranged alternately with suitable separators in the usual manner.

The storage battery shown in the drawings comprises three-cell elements, in which the negative and positive post straps 21 and 22 respectively of the elements of the two outer cells are provided with terminal posts 23 and 24 of similar configuration projecting outside of the container 10, while the other post straps of each of these cells are connected to the post straps of the central cell by concealed intercell connecting means 25 which are flush with the top of the partitions 14 and hence do not project outside of the container 10.

The partitions 14 are provided with suitable lead inserts 26 embedded therein and having a suitable transverse groove adapted to allow the flow of lead for joining the post straps of adjacent battery cells when the intercell connection is carried out by the lead-burning or welding operation. By this arrangement, and through the seal of the invention, preferably by grooving the weld as a continuation of the groove in the top edge of the partitions 14, as hereinafter described, each battery cell can be completely isolated from the others as any creeping or seepage through the intercell connectors or cell interconnecting means 25 is eliminated, due to the fact that the post straps and inserts 26 form an integral structure, as particularly shown in Fig. 2, which also forms a part of the acid-tight joint of the invention.

The upstanding walls of the container 10 are preferably provided with a top end surface, normally on the same level and being interconnected with the upper edges of the partitions 14, forming thereby a continuous uniplanar top section 27 extending about the perimeter of each cell.

A feature of the invention is the provision of a preformed unitary cover 30 (see Fig. 4) for the battery container 10 bridging the cells regardless of their number. The cover 30 is preferably made of non-conductive, acid-resistant material or molded composition such as hard rubber or other synthetic resin plastic and is provided with suitable openings 31 and 32 axially of which the terminal posts 23 and 24 may extend to receive suitable external circuit connections, not shown, for the energy storing means which are housed by the container. The openings 31 and 32 of the cover 30 are provided with reinforcing bosses 33 carrying inserts preferably in the form of flanged antimonial lead bushings 34 which are of suitable dimensions in order that when the cover is put on the container 10, the bushings 34 are in tight engagement with each of the terminal posts, so that during the lead-burning operation by the application of heat, fusion therebetween takes place, thus forming, in welded union with the upstanding section of the post straps, an acid-proof and gas-tight connection for the terminal posts 23 and 24.

As shown in Fig. 4, the cover 30 is also provided with bosses 35 arranged to be positioned above each cell. The bosses are formed with suitable apertures acting as vents or electrolyte filler openings 36. The under side surface 38 of the cover 30 is molded for effective and complementary contact with the container uniplanar section 27 which extends about the perimeter of each cell. In the production of the molded cover 30, strength is imparted thereto by suitable reinforcing ribs 39, preferably formed on its underside surface and adjacent to the vent and terminal post openings so as to prevent possible distortion of the area adapted to be in contact with the container walls and cell partitions.

The cover 30 is adhered or rigidly secured to the container 10 by the substantially permanent bond or seal 40 of the invention which completely isolates each cell by joining portions of the under-side surface 38 of the cover to the uniplanar surface 27 of the container 10 and partitions 14, thereby forming a bonded connection about the perimeter of each cell, thus producing a substantially permanent, acid-tight, temperature and vibration-proof seal between the container and cover.

The seal or bond 40 of the invention is obtained by the provision and use of a binder or sealing agent of the thermosetting type in the form of a thermosetting resin or cementitious compound preferably of the phenolic class, which binding agent is set, cured, or solidified to produce adhesion of the cover and container by the application of moderate heat and pressure for a relatively short time hastened by the addition of suitable accelerators. The substantially permanent seal between the container and cover is preferably secured by providing a suitable interlocking connection between the under side surface 38 of the cover 30 and the uniplanar top surface 27 of the container 10 and partitions 14. The interlocking connection can be in the form of roughened, substantially flat matched surfaces of container and cover, joined by the bonding agent 40, or in the form of a double flanged cover adapted to receive the container top end walls and partitions as well as other suitable well known types of interlocking connections, the illustration of which is not deemed necessary.

The preferred interlocking connection 44 in the embodiment illustrated in the drawing is in the form of a tongue-and-groove joint. In Fig. 4, the cover is illustrated as formed with a tongue 46 which may be integral therewith, the same being so placed as to provide an interfitting arrangement with a groove 48 which may be made or formed on the uniplanar section 27 of the container and partitions 14 as particularly shown in Figs. 2 and 3. However, it is contemplated that this tongue-and-groove arrangement may be reversed, so that the tongue may be integral with the uniplanar section 27 of the container and partitions and the groove being formed on the under side of the cover 30. In the embodiment of the invention, the retention of the bonding agent for sealing the cover 30 to the container 10 is enhanced by having the groove 48 uninterrupted not only about the perimeter of the container and across the partitions 14, but also about the cell interconnecting means 25, while the tongue 46 on the under side of the cover 30, which is adapted to fit into the groove 48, is also made continuous throughout the corresponding area of engagement, so that a very effective joint or interlocking connection of cover and container is obtained.

The seal or bond 40 is preferably obtained by thoroughly cleaning the surfaces to be sealed and by filling the groove 48 with the plastic bonding agent of the invention, or by coating the tongue 46 and the surface of the cover adjacent thereto, or by an application of a coat of the liquid seal or bonding material to the matched or interfitting surfaces of container and cover forming the interlocking connection 44, following which the cover is pressed into assembly and the seal or binding agent is cured or thermoset to provide the final bond 40.

In the application of the thermosetting liquid resin of the invention, it is very desirable to clean and roughen the complementary or mating surfaces of container and cover forming the interlocking connection 44 such as the tongue-and-groove joint of the container and cover by sand blast, scratch brush, or the like, which not only removes any parting compounds employed in the casting or molding of these battery parts, but provides a surface more susceptible for bonding. This roughened surface may also be obtained by direct molding but the same should be cleaned, preferably by sand blasting, for best adhesion to the resin cement.

The sealing compound of the invention is a phenolic thermosetting casting resin, preferably in liquid form, which, without the use of complicated equipment, skilled operators, or time-consuming operations, can be set or cured by the application of moderate heat, as well as heat and accelerators. The thermosetting phenolic casting resin is of a type which has a specific gravity from 1.12 to 1.27, preferably 1.25, has no tendency when thermoset to "cold-flow," does not burn readily, and is white opaque in color, and can be set or cured by the application of moderate heat, as well as heat and accelerators.

The thermosetting resin or cementitious compound which produces the seal of the invention can be cured or permanently set without pressure or accelerators when baked at about 200° F. for relatively long periods of time, such as 24 hours. Moreover, such resin is more reactive or readily set in a shorter time and at lower temperatures by the addition of suitable accelerators. In practice, it was found that by the addition of about 8 per cent of an acidic accelerator to the resin, the mixture can be set or solidified to provide an effective bond between the cover and container when baked at a heat of 175° F. for three hours or when baked at 125° F. for sixteen hours. Moreover, many combinations of temperature and heating time can be used and the resin or cement of the invention can be set or cured at room temperature in relatively short time by the addition of higher percentages of the accelerator. While the method of producing a liquid phenolic resin is well known in the art, having been described in the chemical literature, for purpose of illustration only, and not by way of limitation, a liquid phenolic resin, suitable for carrying out the present invention, may consist of the reaction product of formaldehyde and phenol using relatively high mol ratios of formaldehyde to phenol reacted under reflux conditions in the presence of a suitable fixed catalyst, preferably alkaline to promote resinification of the two materials. The catalyst may be neutralized by the use of either an inorganic acid such as hydrochloric or organic acid such as lactic acid after the formaldehyde has been consumed. The mass is preferably subjected to proper condensation and dehydration steps to obtain the proper viscosity or consistency. Resins typical of this class, possessing the characteristics herein specified for the bonding agent of the invention, are on the market and are commercially designated as "Durez Casting Resins 7421 and 7421A" made by Durez Plastics & Chemicals, Inc. It has been found that such resins are very suitable and provide an excellent seal when the materials employed in the container and cover are hard rubbers, although, with other molded compositions, the same have proven satisfactory.

Another material improvement secured by this invention resides in the utilization of the heat generated during the chemical and electrochemical processing of the battery to secure the setting of the liquid phenolic seal resin of the invention to thereby produce a bond or seal between the cover and container; that is, the heat generated when the developing acid or electrolyte is added to the cells and in the charging of the cells. Such heat is sufficient to bring or set the bonding agent which is in contact with the container and cover to its full strength within the time required to develop the battery cells to their fully formed and charged condition, thus avoiding the application of external heat and of other additional time-consuming operations.

This phenolic, thermosetting liquid casting resin of the invention may have various treatments to accomplish certain desired results. For example, an accelerator may be added to decrease the length of time necessary to complete the thermoset. It has been found that a suitable accelerating compound is one containing approximately a 50 per cent solution of phosphoric or of hypo-phosphorous acid such as the one commercially available and designated as "Durez accelerator 7422," made by Durez Plastics & Chemicals, Inc. Amounts of the accelerator may vary to meet desired conditions and may run in the neighborhood of 5 to 15 per cent, 8 per cent thereof meeting the majority of requirements. There may also be added to the plastic or to the plastic and its accelerator a suitable coloring matter, for example, .5 per cent Nubian black dye which will render the seal the color of the battery parts adjacent thereto.

A specific example of the preferred bonding agent or resin seal of the invention, as well as one of the most effective methods of producing the same, comprises in mixing the ingredients in the order and in the following proportions.

| | Percent by weight |
|---|---|
| Durez 7421A liquid resin | 90 |
| Durez 7422 accelerator | 8 |
| Denatured alcohol | 1.5 |
| Nubian Black dye | .5 |

Mix the 7421A liquid resin and 7422 accelerator together thoroughly; then add the alcohol to this composition; do not stir but let the alcohol remain on the surface until the dye is added; then mix thoroughly. The alcohol wets the dye and carries it into solution very quickly, otherwise a longer period of stirring is necessary to get the dye into the resin solution. The mixed resin prepared for use should be kept at a temperature of 70° F. or slightly less to prolong its bonding or "glue life," and preferably no more than 3 hours, supply of resin seal should be made up at one time, otherwise the mixture may become too viscous for effective application to the battery parts.

A storage battery embodying the seal and the bonding agent of the invention for adhering the container and its covering means can be produced with a high degree of effectiveness by employing the following procedure:

Sand-blast or steel grit blast, just prior to assembly, the seal surfaces forming the interlocking connection 44 of both the hard rubber container and the one-piece cover such as the tongue 46 and the groove 48 shown. The sand or steel particles blasting should be sufficient to obtain roughened surfaces but not severe enough to damage the hard rubber parts. After the grit blasting or surface roughening operation, remove the dust from the cover and container, preferably by blowing the dust away with compressed air free of moisture.

Assemble the cell elements 20 in the compartments 12 of the container 10, placing the element posts 21 and 22 in proper position for alignment with the openings 31 and 32 of the cover 30. If concealed intercell connections are used, perform the lead-burning and then grooving operation for the intercell connecting means 25. The seal groove 48 and the uniplanar surface 27 after these operations should be cleaned and kept clean and dry.

Fill the groove 48 on top of the container approximately ⅔ full of the bonding agent or resin sealing compound of the invention prepared as outlined in the specific example given above. Spread the bonding agent or seal resin over the uniplanar surface 27 of the container by the use of a suitable tool, such as a brush, to secure a good coating thereto.

Heat the surface roughened or sand-blasted and clean cover 30 up to 150° F., then place the same on top of the battery container sub-assembly and immediately apply moderate pressure to hold the cover in position. If any sealing compound exudes between the cemented joints, wipe it off by an alcohol dampened cloth. In order to avoid the possibility of relative displacement of the container and covering means, as well as to firmly hold the cemented joints together, the use of an antimonial lead weight of about 15 pounds has been found very effective. This weight should have a configuration suitable to exert pressure over the areas where the covering means joins the container 10 and partitions 14 without interfering with the post or connector-burning operations as well as with the electrical connections of the source of energy used for the formation of the battery plates.

After the weight and cover are in position on the container, effect the lead-burning or the sealing of the posts 23 and 24 to the cover bushings 44. In case exposed intercell connectors are used, the lead-burning operation to produce the external welded connections should be carried out.

Fill the battery cell compartments 12 with developing acid, preferably in a suitably ventilated and temperature controlled room, wherein the air temperature is maintained for satisfactory efficiency above 60° F. Connect the terminal posts 23 and 24 to a suitable source of electric current for the electrochemical formation of the battery plates. The temperature of the acid within the container should be maintained, by suitable control means, between 120° F. and 130° F. during the initial stage of electrochemical formation of the plates until the resin or sealing compound of the invention undergoes the polymerization or thermosetting which is accomplished within a 16 to 24-hour period when an accelerator is used. Following this time period, the temperature of the acid may be permitted to drop to a lower temperature value for the completion of the electrochemical formation of the plates. The heat generated by the formation of the plates and the time period during which the acid within the container is maintained between 120° F. and 130° F., are created and controlled conditions, with respect to temperature and time, by means of which the effective curing or polymerization of the sealing compound of the invention is accomplished to produce the adhesion or interfusion of the battery covering means and seal to its container. During the charging or plate-forming operation it has been found very advantageous to keep the weight in position on top of the cover 30, avoiding the application of any lifting force to the cover or accidental disturbance of the weight. On completion of the formation of the battery cells, the weight should be removed from the battery cover as the seal is completely set and the battery can then be handled in the normal manner for any desired additional operations.

The foregoing outlined procedure clearly indicates that the present invention provides a cementitious, acid-resistant, insulating compound or thermosetting bonding agent which is processed or polymerized to produce the electrolyte-tight, vibration and temperature-proof, substantially permanent seal between a storage battery covering means and container as a result of conditions created by and within the battery and the time during which the electrochemical formation of the battery cells takes place. The polymerization or setting of the thermosetting bonding agent of the invention is accomplished by this invention through a very low cost process which in no way interferes with the normal steps in the processing of a battery or impairs in any way its efficiency or the life of the component parts. Moreover, by this invention the sealing of the covering means to the container is secured without the application of any external heating means or the use of expensive equipment as well as additional operations which usually interfere with the normal assembly of the battery and increase its manufacturing cost and, therefore, the teachings of the invention can also be carried out in the charging operation used in battery repair or rebuilding procedures.

The sealing agent of the invention, as well as the procedures before outlined to effect the bonding of battery containers and their covering means by conditions created during the formation of the battery plates, may also be used with batteries designed for the conventional type of seal using external intercell connectors and separate covers for each cell, such as the type shown in Fig. 5, wherein the cover 60 is formed with a peripheral depending portion 66 and with the lateral extension 68 resting on a ledge 70 of the container 72. The space above the extension 68, bonded by the container upstanding wall 73 and the cover portion 66, which is usually filled with the conventional asphalt type of sealing compound, is filled instead with the sealing agent 40' of the invention, or a seal preferably prepared according to the specific example herein described.

In order to produce at a very low cost the seal of the invention for conventional type batteries, a suitable filler is preferably added with the dye coloring mixture to the phenolic casting resin and its accelerator. Very satisfactory results have been obtained with fillers such as diatomaceous earth, commercially available as "Dicalite," asbestos fiber or walnut shell flour, in amounts of 15 to 30%, according to the consistency desired in such a seal. To prevent the possibility of the resin running past the edges of the cover extension 68 into the cell compartments, it has been found very effective to first calk with a pasty mixture of liquid resin and a powdered filler, such as finely powdered asbestos or silica, the spaces or gaps between the extension 68 of the cover and the cell walls including the ledge 70 of the container 72. When the viscous resin with its accelerator, with or without filler, is poured on top of this stiffened calking mixture and heated during the plate-formation or cell-charging operation, the poured resin may become even more fluid before it polymerizes but the stiff calking material holds it in place until the resin hardens and bonds the cover 60 to the container 72.

When batteries are produced with the types of seal herein described, the bond between the cover and container is such that there is provided not only an acid-proof joint but a permanent, gas-tight seal, and therefore, batteries made according to the teachings of the present invention are susceptible to indefinite storage in a substantially charged condition. In order that a hermetic seal may be complete, means including removable or frangible elements are also contemplated to close the vent openings as well as the ports of the vent plugs normally employed in electric storage batteries. As shown in Figs. 2 and 3, the openings 36 of the cover 30 are normally closed by vent plugs 53 provided with suitable ports 55 in communication with the atmosphere. The ports 55 and any openings or cracks around the vent plugs 53 may be closed during the storage periods of the battery by placing temporary sealing means, such as a removable strip of non-porous adhesive tape 57, around the joint between the vent plugs 53 and cover, as well as completely covering the vent plug's ports 55. When the battery is withdrawn from storage, this adhesive tape 57 is readily peeled from the cover and vent plugs 53, thus permitting removal of the plugs for filling the cells with electrolyte as may be found desirable. With the hermetic seal between the multicell container and the cover, which isolates the individual cells, one from another, in conjunction with the seal for vent ports, there is provided a complete hermetic seal for the battery providing the advantages hereinbefore set forth.

The cover can also be provided with frangible means, such as disk closures for the vent openings, either molded as an integral part of the cover, or cemented in place to hermetically close the vent opening during storage. These disks are broken out when it becomes necessary to put the dry charged battery into service by adding electrolyte to the cells.

It is to be understood that the above detailed description of the present invention is intended to disclose embodiments thereof to those skilled in the art, but that the invention is not to be construed as limited in its application to the details of construction and arrangement of parts illustrated in the accompanying drawings, since the invention is capable of being practiced and carried out in various ways without departing from the spirit of the invention. The language used in the specification relating to the operation and function of the elements of the invention is employed for purposes of description and not of limitation.

What is claimed and it is desired to secure by United States Letters Patent:

1. The method of producing an electric storage battery including the steps of placing between the battery container and its covering means a thermosetting phenolic formaldehyde liquid casting resin of a type which has its primary condensation with a fixed alkaline catalyst and solidifies to its cured state by the application of moderate heat in the presence of a liquid sulphuric acid electrolyte, and of controlling and regulating the temperature of the heat generated by the electrochemical processing of the battery plates to form the plates and concurrently polymerizing the thermosetting resin producing a battery having its container and covering means permanently bonded together.

2. The steps in the method of producing an electric storage battery which comprise the application between the battery cover and container of a thermosetting phenolic formaldehyde liquid casting resin of the class having a primary alkaline condensation, and generating heat by the formation of the battery plates for polymerizing to its cured state the thermosetting resin for permanently bonding the battery cover and container during the plate forming operation.

3. The method of producing an electric storage battery including cleaning and roughening the respective contacting surfaces of a container carrying battery plates and its covering means, coating said contacting surfaces with a liquid phenolic formaldehyde thermosetting casting resin of a class which has high mol ratio of formaldehyde to phenol and its primary condensation under reflux conditions with a fixed alkaline catalyst, pressing the contacting surfaces of the container and covering means into engagement, electrochemically processing the plates, and concurrently polymerizing the thermosetting resin to its cured state by the heat generated during the processing of the plates to produce a permanent temperature-resistant electrolyte leak-proof joint between covering means and container.

4. The method of forming a permanent union between an open ended container made of hard rubber having separate compartments for housing battery elements surrounded by liquid electrolyte and covering means therefor comprising applying about the perimeter of each compartment between the container and covering means a thermosetting liquid resin of a class which is reacted to its liquid state in the presence of an alkaline catalyst mixed with an acidic accelerator therefor, and generating heat by the formation of the battery plates for solidifying to its cured state the resin bonding the battery cover and container concurrently with the plate-forming operation for permanently isolating the battery compartments.

5. The method of forming a permanent union between the open end of a container of a liquid sulphuric acid type electric storage battery and a covering means therefor comprising placing between the container and the covering means a thermosetting plastic cementitious viscous material of a class having a primary condensation to its viscous state with an acidic accelerator, and solidifying to its final cured state the viscous material by the heat generated during the electrochemical processing of the battery plates.

6. The method of forming a permanent union between the open end of a container of electric battery elements surrounded by a liquid electrolyte and covering means therefor, including cleaning and roughening their respective contacting surfaces, coating said roughened surfaces with a liquid phenolic formaldehyde thermosetting resin of a class which has its primary condensation to a liquid state with a fixed alkaline catalyst mixed with an acidic accelerator therefor, pressing the contacting surfaces of the covering means and container into engagement, and charging the battery cells for thermosetting said resin to its final cured state by the heat generated thereby.

HOWARD C. BURNS.
HARLAND D. WILSON.

References Cited in the file of this patent

UNITED STATES PATENTS

| Number | Name | Date |
|---|---|---|
| 1,508,847 | Gillette | Sept. 16, 1924 |
| 1,526,208 | Gill | Feb. 10, 1925 |
| 1,784,216 | Aldrich et al. | Dec. 9, 1930 |
| 2,034,802 | Frank et al. | Mar. 24, 1936 |
| 2,066,675 | Dunzweiler | Jan. 5, 1937 |
| 2,100,333 | Hess | Nov. 30, 1937 |
| 2,132,186 | Ramakers | Oct. 4, 1938 |
| 2,501,995 | Dillehay | Mar. 28, 1950 |

FOREIGN PATENTS

| Number | Country | Date |
|---|---|---|
| 510,488 | Great Britain | Aug. 2, 1939 |

OTHER REFERENCES

Modern Plastics by Barron—1945. Pages 121–136. Published by Wiley & Sons, Inc., N. Y., N. Y.